(12) United States Patent
Makimae et al.

(10) Patent No.: US 7,398,700 B2
(45) Date of Patent: Jul. 15, 2008

(54) BOLT TIGHTENING METHOD AND BOLT TIGHTENING APPARATUS

(75) Inventors: Tatsumi Makimae, Hiroshima (JP); Yutaka Fujii, Hiroshima (JP); Hiroshi Shinagawa, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 198 days.

(21) Appl. No.: 11/358,218

(22) Filed: Feb. 22, 2006

(65) Prior Publication Data

US 2006/0218768 A1    Oct. 5, 2006

(30) Foreign Application Priority Data

Mar. 29, 2005  (JP) .............................. 2005-095814

(51) Int. Cl.
*G01L 5/24*    (2006.01)
*B23Q 5/00*    (2006.01)

(52) U.S. Cl. ..................... 73/862.24; 700/275; 173/176

(58) Field of Classification Search . 73/862.23–862.24; 29/407.03; 700/275; 318/432; 173/176
See application file for complete search history.

(56) References Cited

U.S. PATENT DOCUMENTS 4,987,669 A * 1/1991 Makimae et al. ......... 29/407.03
5,404,643 A    4/1995 Rice
6,954,682 B2 * 10/2005 Makimae et al. ............ 700/275
2004/0027082 A1    2/2004 Makimae et al.

FOREIGN PATENT DOCUMENTS

JP    02-041830    2/1990
JP    07256566 A *  10/1995

OTHER PUBLICATIONS

European Search Report dated May 31, 2006.

* cited by examiner

*Primary Examiner*—Edward Lefkowitz
*Assistant Examiner*—Jonathan Dunlap
(74) *Attorney, Agent, or Firm*—Studebaker & Brackett PC; Donald R. Studebaker

(57) ABSTRACT

After it is tightened with a snug torque $T_A$, a bolt is tuned by a total turning angle $\theta_S$ equivalent to the sum of an initial-set turning angle $\theta_A$ and a corrective additional-turning angle $(\theta_B+\theta_C)$. The corrective additional-turning angle $(\theta_B+\theta_C)$ is the sum of a first corrective additional-turning angle $\theta_B$ and a second corrective additional-turning angle $\theta_C$, the first corrective additional-turning angle $\theta_B$ being to compensate for a situation where a bolt turning angle $\theta 22$ corresponding to the snug torque $\theta_A$ on an extension line of the bolt tightening torque properties C2 in a late tightening stage II is different from a bolt turning angle $\theta 11$ corresponding to the actual snug torque $T_A$, the second corrective additional-turning angle $\theta_C$ being to compensate for a decrease of an effective bolt axial force that is caused by an existence of the initial tightening stage I.

7 Claims, 11 Drawing Sheets

FIG. 10       Prior Art

BOLT TIGHTENING METHOD AND BOLT TIGHTENING APPARATUS

BACKGROUND OF THE INVENTION

The present invention relates to a method and an apparatus for tightening bolts. In particular, it relates to those that is suitably applicable to a bolt having bolt tightening torque properties, in which a torque gradient expressed in terms of the ratio of an additional tightening torque exerted on a bolt to its additional turning angle has a first torque gradient in an initial bolt tightening stage and a second torque gradient in a late bolt tightening stage subsequent to the initial bolt tightening stage, a magnitude of the second torque gradient being greater than that of the first torque gradient.

A bolt tightening method in which at first the bolt is tightening until a bolt tightening torque reaches (becomes) a predetermined snug torque and subsequently the bolt is turned by a predetermined initial-set turning angle (hereinafter, referred to as "torque+angle method") is well known.

This conventional torque+angle method (snug torque $T_A$+initial-set turning angle $\theta_A$) provides a relatively stable bolt axial force if relationships between the bolt turning angle $\theta$ and the bolt tightening torque T were substantially proportional, for example, as shown by tightening torque properties C1 in FIG. 10. However, when the conventional torque+angle method is applied to a case where the properties have bent properties, like C2 or C2' in the figure, comprising an initial bolt tightening stage I having a smaller torque gradient and a late bolt tightening stage II having a larger torque (torque gradient being expressed in terms of the ratio of an additional tightening torque exerted on the bolt to its additional turning angle), there is a problem that the bolt axial force would scatter (become unstable) according to scattering of bent position of the properties.

The above-described properties like the property C2 appear in a case, for example, where an elastic deforming member is located between fastened members and these fastened members are fastened with the elastic deforming member, in which the elastic deforming member would be eliminated (crushed) in the above-described initial bolt tightening stage I.

Meanwhile, in a case where the fastened member are fastened with no elastic deforming member between them or the mount of the above-described elimination (crush) is almost zero, the properties would be like C1. If the elimination has a certain degree of amount, it would be like the properties C2, and if the amount of elimination is more than that, it would be like the properties C2'. Accordingly, since the bent position scatters according to changing of the amount of this elimination as shown in FIG. 10, the bolt axial force also scatters.

Further, part of the bolt axial force is consumed (used) for the elimination of the elastic deforming member in the initial bolt tightening stage I of the properties C2, C2'. As a result, there is a problem that the effective bolt axial force acting on the fastened members would decrease eventually.

Another method (hereinafter referred to as "seating-point angle method") that can solve the above-described problems, which is shown in FIG. 11, is also known (for example, see Japanese Patent Laid-Open Publication No. 2-41830).

FIG. 11 is a graph showing the seating-point angle method. Herein, in the case of the bolt tightening torque properties C1 (the same as C1 of FIG. 10), the bolt is turned from a tightening start point (the bolt turning angle $\theta$=0) to an initial-set turning angle $\theta$91 (point P91).

In the case of the bent properties C2, C2', meanwhile, at first the bolt is turned by the initial-set turning angle $\theta$91 from respective theoretical seating points P93 (the bolt turning angle $\theta$=$\theta$93), P95 (the bolt turning angle $\theta$=$\theta$95) and subsequently it is further turned by respective additional-turning angle $\theta_C$, $\theta_C'$. Thus, the bolt tightening is finished (at points P97, P98).

Since the seating-point angle method is described in detail in the above-described publication, hereinafter the features of the method will be described briefly. The first feature of that is that the starting point of the bolt turning angle is shifted from its actual starting point (the bolt turning angle $\theta$=0) to the theoretical seating points P93 (the bolt turning angle $\theta$=$\theta$93), P95 (the bolt turning angle $\theta$=$\theta$95) in the late bolt tightening stage II. The second feature is that the bolt is further turned by a specified angle (the corrective additional-turning angle $\theta_C$, $\theta_C'$) that is equivalent to the decrease amount of the effective bolt axial force acting on the fastened members due to the existence of the initial bolt tightening stage I (the crush of the elastic deforming member in the above-described example).

The theoretical seating point P93, which is a hypothetical point as a bolt tightening starting position when the bolt torque properties C2 is assumed to be substantially linear like the bolt torque properties C1, is defined as a point of intersection of an extension line of the bolt tightening torque properties C2 in the late tightening stage II and the line of the bolt tightening torque T=0. When the bent position of the bolt tightening torque properties C2 scatters and changes to the properties like the C2', the theoretical seating point P93 shifts to the point P95 (the bolt turning angle $\theta$=$\theta$95) as shown in the figure. Because the theoretical seating point shifts accordingly even if the bent position of the properties scatters, an influence caused by this scatter of the bent position can be properly suppressed by setting the bolt turning angle to the theoretical seating point.

The corrective additional-turning angle $\theta_C$ of the second feature of the seating-point angle method is defined as an angle difference between the theoretical seating point P93 and the bent position P94 (the intersection point of the properties in the initial bolt tightening stage I and the properties in late bolt tightening stage II). The bolt tightening torque T94 corresponding to the bent position P94 is a bolt tightening torque that is equivalent to the decrease amount of the effective bolt axial force acting on the fastened members due to the existence of the initial bolt tightening stage I. Accordingly, this decrease of the effective bolt axial force can be compensated (corrected) by turning the bolt additionally by the angle $\theta_C$ corresponding to the bolt tightening torque T94 in the late bolt tightening stage II.

When the bent position of the bolt tightening torque properties C2 scatters and changes to the properties like the C2', the bent position P94 shifts to the bent point P96 (the bolt tightening torque T=T96) as shown in the figure. T96 is greater than T94, which is influenced by the initial bolt tightening stage I. Meanwhile, the corrective additional-turning angle $\theta_C$ changes to $\theta_C'$, which is increased from $\theta_C$ by a specified amount of angle that is proportional to the decrease amount of the effective bolt axial force acting on the fastened members.

Namely, by setting the corrective additional-turning angle $\theta_C$ this way, the decrease of the effective bolt axial force acting on the fastened member due to the existence of the initial bolt tightening stage I can be effectively compensated, and the proper additional-turning angle can be obtained regardless of a location of the bent position P94 of the bolt tightening torque properties C2.

Thus, according to the seating-point angle method, the bolt is turned until the bolt turning angle $\theta$ reaches a total angle of the bolt turning angle θ93 corresponding to the theoretical seating point P93, the initial-set turning angle θ91, and the corrective additional-turning angle θ$_C$. Then, the bolt tightening is finished at this point (the point P97). In the case of the properties C2', the bolt is tuned until it reaches the point P98 as shown in the figure, where the bolt tightening is finished.

In both cases, the scatter of the bolt axial force due to the change of bent position can be suppressed eventually and the decrease of the effective bolt axial force acting on the fastened members due to the existence of the initial bolt tightening stage I can be compensated (corrected) properly as well.

As described above, according to the seating-point angle method disclosed in the above publication, the scatter of the bolt axial force due to the change of bent position can be suppressed and the decrease of the effective bolt axial force acting on the fastened members due to the existence of the initial bolt tightening stage I can be compensated properly even for the bolt having the bent tightening torque properties described above. However, most of the facilities or apparatuses that prevail nowadays are designed for the torque+angle method. Since the torque+angle method is considerably different from the seating-point angle method, it may not be so easy to apply the seating-point angle method to such facilities or apparatuses. Namely, the starting point of the bolt turning angle θ in the torque+angle method is a reaching point of the snug torque T$_A$ (the point P3 in FIG. 10) and the bolt turning-angle control starts from this point. In the seating-point angle method shown in FIG. 11, however, the bolt turning-angle control is required from the initial stage of the bolt turning. Thus, the control manners are considerably different from each other.

Accordingly, a new bolt tightening method has been desired, in which the torque+angle method is adopted basically so as not to need to remake the conventional facilities or apparatus greatly and the scatter of the bolt axial force due to the change of bent position can be suppressed and the decrease of the effective bolt axial force acting on the fastened members due to the existence of the initial bolt tightening stage I can be compensated properly even for the bolt having the bent tightening torque properties.

SUMMARY OF THE INVENTION

The present invention has been devised in view of the above-described things, and an object of the present invention is to provide a method and an apparatus for tightening bolts, in which the torque+angle method is adopted basically and the scatter of the bolt axial force due to the change of bent position can be suppressed and the decrease of the effective bolt axial force acting on the fastened members due to the existence of the initial bolt tightening stage can be compensated properly even for the bolt having the bent tightening torque properties.

According to the present invention, there is provided a bolt tightening method applicable to a bolt having bolt tightening torque properties, in which a torque gradient expressed in terms of the ratio of an additional tightening torque exerted on a bolt to its additional turning angle has a first torque gradient in an initial bolt tightening stage and a second torque gradient in a late bolt tightening stage subsequent to the initial bolt tightening stage, a magnitude of the second torque gradient being greater than that of the first torque gradient, the method comprising the steps of tightening the bolt with a predetermined snug torque, and turning the bolt subsequently by a total turning angle that is equivalent to the sum of a predetermined initial-set turning angle and a corrective additional-turning angle, wherein the corrective additional-turning angle is the sum of a first corrective additional-turning angle and a second corrective additional-turning angle, the first corrective additional-turning angle being to compensate for a situation in which a bolt turning angle corresponding to the snug torque on an extension line of the bolt tightening torque properties with the second torque gradient is greater than a bolt turning angle corresponding to the snug torque on a line of the bolt tightening torque properties with the first torque gradient, the second corrective additional-turning angle being to compensate for a decrease of an effective bolt axial force that is caused by an existence of the bolt tightening torque properties with the first torque gradient.

Hereinafter, an axial force that will be described below means a bolt axial force as well.

According to the bolt tightening method of the present invention, the torque+angle method is used basically in which at first the bolt is tightened with the snug torque and subsequently it is turned by the total turning angle equivalent to the sum of the initial-set turning angle and the corrective additional-turning angle. Further, the corrective additional-turning angle is the sum of the first corrective additional-turning angle and the second corrective additional-turning angle, and the first corrective additional-turning angle is set to compensate for a situation in which the bolt turning angle corresponding to the snug torque on the extension line of the bolt tightening torque properties with the second torque gradient is greater than the bolt turning angle corresponding to the snug torque on the line of the bolt tightening torque properties with the first torque gradient. Thereby, the compensation can be properly achieved by assuming that the point at the snug torque is in the late bolt tightening stage of the bolt tightening torque properties even if it is actually in the initial bolt tightening state.

Further, the second corrective additional-turning angle is set to compensate for the decrease of the effective bolt axial force that is caused by the existence of the bolt tightening torque properties with the first torque gradient. Thereby, the decrease of the effective bolt axial force can be also compensated (corrected) effectively.

Thus, the scatter of the bolt axial force due to the change of bent position can be suppressed and the decrease of the effective bolt axial force acting on the fastened members due to the existence of the initial bolt tightening stage can be compensated properly even for the bolt having the bent tightening torque properties.

According to an embodiment of the present invention, the first corrective additional-turning angle is equivalent to an angle difference between a first corrective starting point angle that is equivalent to the bolt turning angle corresponding to the snug torque on the line of the bolt tightening torque properties with the first torque gradient and a first corrective ending point angle that is equivalent to the bolt turning angle corresponding to the snug torque on the extension line of the bolt tightening torque properties with the second torque gradient.

Thereby, the first corrective starting point angle can be determined easily and properly by considering the bolt tightening torque properties with the second torque gradient in the late bolt tightening stage as a linear function.

According to another embodiment of the present invention, the second corrective additional-turning angle is equivalent to an angle difference between a second corrective starting point angle corresponding to a second corrective starting point torque that is equal to or smaller than the snug torque on the extension line of the bolt tightening torque properties with the second torque gradient and a second corrective ending point angle corresponding to a point of intersection of an extension line of the bolt tightening torque properties with the first torque gradient and the extension line of the bolt tightening torque properties with second torque gradient.

Herein, the second corrective starting point torque also contains zero or a magnitude of the snug torque.

Thereby, the second corrective starting point angle can be determined easily and properly by considering each of the bolt tightening torque properties with the first and second torque gradients in the initial and late bolt tightening stages as the linear function.

According to another embodiment of the present invention, the torque gradient is calculated based on a gradient-calculation starting point angle that is obtained by turning the bolt from a standard turning angle corresponding to a predetermined standard torque by a specified angle, a gradient-calculation ending point angle that is obtained by further turning the bolt from the gradient-calculation starting point angle by a specified angle, and respective bolt tightening torques corresponding to the gradient-calculation starting point angle and the gradient-calculation ending point angle.

Herein, the standard torque may have a magnitude that is equal to or different from the snug torque.

Thereby, the torque gradient is calculated based on the bolt tightening torque read at the specified bolt turning angle, and thus the calculation can be done more accurately than the method in which the torque gradient is calculated based on the bolt turning angle read at the specified bolt tightening torque. Namely, it is necessary to determine respective relationships between the bolt turning angle and the bolt tightening torque in the initial bolt tightening stage and the late bolt tightening stage in order to calculate the first and second torque gradients. In the method in which the torque gradient is calculated based on the bolt turning angle read at the specified bolt tightening torque, there may be a high likelihood that the reading range (the range of bolt tightening torque from the reading starting point to the reading ending point) is located out of the initial bolt tightening stage and the late bolt tightening stage due to some conditions such as an unstable friction on a the bolt seat face. In the method according to the present invention that the torque gradient is calculated based on the bolt tightening torque read at the specified bolt turning angle, however, the range of bolt turning angle having more accuracy that is located within the range of the initial bolt tightening stage and the late bolt tightening stage can be set as the reading range. Thereby, there can be less likelihood that the reading range is located out of the initial bolt tightening stage and the late bolt tightening stage.

According to another embodiment of the present invention, the above-described torque gradient calculation is used when the second torque gradient is calculated.

Herein, the above-described concern of the reading range being located out of the stages may occur in calculating the second torque gradient especially. Accordingly, the above-described torque gradient calculation can be used effectively in calculating the second torque gradient.

As a specific bolt tightening case in which the present invention is applicable, the following cases can be considered. One case is that an elastic deforming member is located between fastened members and the fastened members are fastened to each other with the elastic deforming member by tightening the bolt, and an amount of deformation of the elastic deforming member is greater than that of the fastened member in the initial bolt tightening stage. Another specific case is that the above-described fastened members comprise a mounting body and a bearing cap, which have a half-circle shaped bearing bore respectively, the elastic deforming member comprises two halves of a half-shell bearing fitted in the bearing bore of the mounting body and the bearing cap, the half-shell bearing has an outer periphery that is greater than a periphery of the bearing bore in a state before the mounting body and the bearing cap are fastened, and when the mounting body and the bearing cap are fastened, the half-shell bearing is deformed in the initial bolt tightening stage in such a manner that a greater part thereof is eliminated. Further another specific case is that the above-described bearing bore is formed after the bearing cap is fastened to the mounting body by tightening the bolt in such a manner that at first the bolt is tightened with the snug torque and then turned by the initial-set turning angle. Thus, these specific cases can properly provide the above-descried effects of the present invention.

Further, according to another aspect of the present invention, there is provided a bolt tightening apparatus applicable to a bolt having bolt tightening torque properties, in which a torque gradient expressed in terms of the ratio of an additional tightening torque exerted on a bolt to its additional turning angle has a first torque gradient in an initial bolt tightening stage and a second torque gradient in a late bolt tightening stage subsequent to the initial bolt tightening stage, a magnitude of the second torque gradient being greater than that of the first torque gradient, the apparatus comprising a bolt turning device operative to turn the bolt around a bolt axis, a torque detecting device operative to detect a torque applied to the bolt, a bolt turning angle detecting device operative to detect a bolt turning angle, a control device operative to control an operation of the bolt turning device, and a corrective additional-turning angle calculating device operative to calculate a corrective additional-turning angle that is equivalent to an amount of additional tightening of the bolt to be added to a predetermined amount of initial tightening of the bolt, wherein the control device is configured so to operate the bolt turning device until a bolt tightening torque detected by the torque detecting device becomes a predetermined snug torque and subsequently operate the bolt turning device until a bolt turning angle detected by the bolt turning angle detecting device becomes a total turning angle that is equivalent to the sum of a predetermined initial-set turning angle and the corrective additional-turning angle calculated by the corrective additional-turning angle calculating device, and the corrective additional-turning angle calculating device is configured so as to calculate a first corrective additional-turning angle and a second corrective additional-turning angle, the first corrective additional-turning angle being to compensate for a situation in which a bolt turning angle corresponding to the snug torque on an extension line of the bolt tightening torque properties with the second torque gradient is greater than a bolt turning angle corresponding to the snug torque on a line of the bolt tightening torque properties with the first torque gradient, and the second corrective additional-turning angle being to compensate for a decrease of an effective bolt axial force that is caused by an existence of the bolt tightening torque properties with the first torque gradient, the sum of the first corrective additional-turning angle and the second corrective additional-turning angle being the corrective additional-turning angle.

According to the above-described apparatus, the above-described bolt tightening method may be carried out properly and easily by basically utilizing the conventional torque+angle method, with just miner modifications if necessary.

According to an embodiment of the above-described apparatus, the first corrective additional-turning angle calculated by the above-described corrective additional-turning angle calculating device is equivalent to the angle difference between the first corrective starting point angle that is equivalent to the bolt turning angle corresponding to the snug torque on the line of the bolt tightening torque properties with the first torque gradient and the first corrective ending point angle that is equivalent to the bolt turning angle corresponding to the snug torque on the extension line of the bolt tightening torque properties with the second torque gradient.

Further, according to another embodiment of the above-described apparatus, the second corrective additional-turning angle calculated by the above-described corrective additional-turning angle calculating device is equivalent to the angle difference between the second corrective starting point angle corresponding to the second corrective starting point torque that is equal to or smaller than the snug torque on the extension line of the bolt tightening torque properties with the second torque gradient and the second corrective ending point angle corresponding to the point of intersection of the extension line of the bolt tightening torque properties with the first torque gradient and the extension line of the bolt tightening torque properties with second torque gradient.

Further, according to another embodiment of the above-described apparatus, the torque gradient calculated by the above-described corrective additional-turning angle calculating device is calculated based on the gradient-calculation starting point angle that is obtained by turning the bolt from the standard turning angle corresponding to the predetermined standard torque by the specified angle, the gradient-calculation ending point angle that is obtained by further turning the bolt from the gradient-calculation starting point angle by the specified angle, and respective bolt tightening torques corresponding to the gradient-calculation starting point angle and the gradient-calculation ending point angle.

Further, according to another embodiment of the above-described apparatus, the mounting body and the bearing cap, which have the half-circle shaped bearing bore respectively, are fastened with two halves of the half-shell bearing fitted in the bearing bore of the mounting body and the bearing cap, the half-shell bearing having the outer periphery that is greater than the periphery of the bearing bore in the state before the mounting body and the bearing cap are fastened, the half-shell bearing being deformed in the initial bolt tightening stage in such a manner that the greater part thereof is eliminated when the mounting body and the bearing cap are fastened.

According to the above-described embodiments of the apparatus, the above-described embodiments of the bolt tightening methods can be carried out properly and easily as well.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Figure 1:
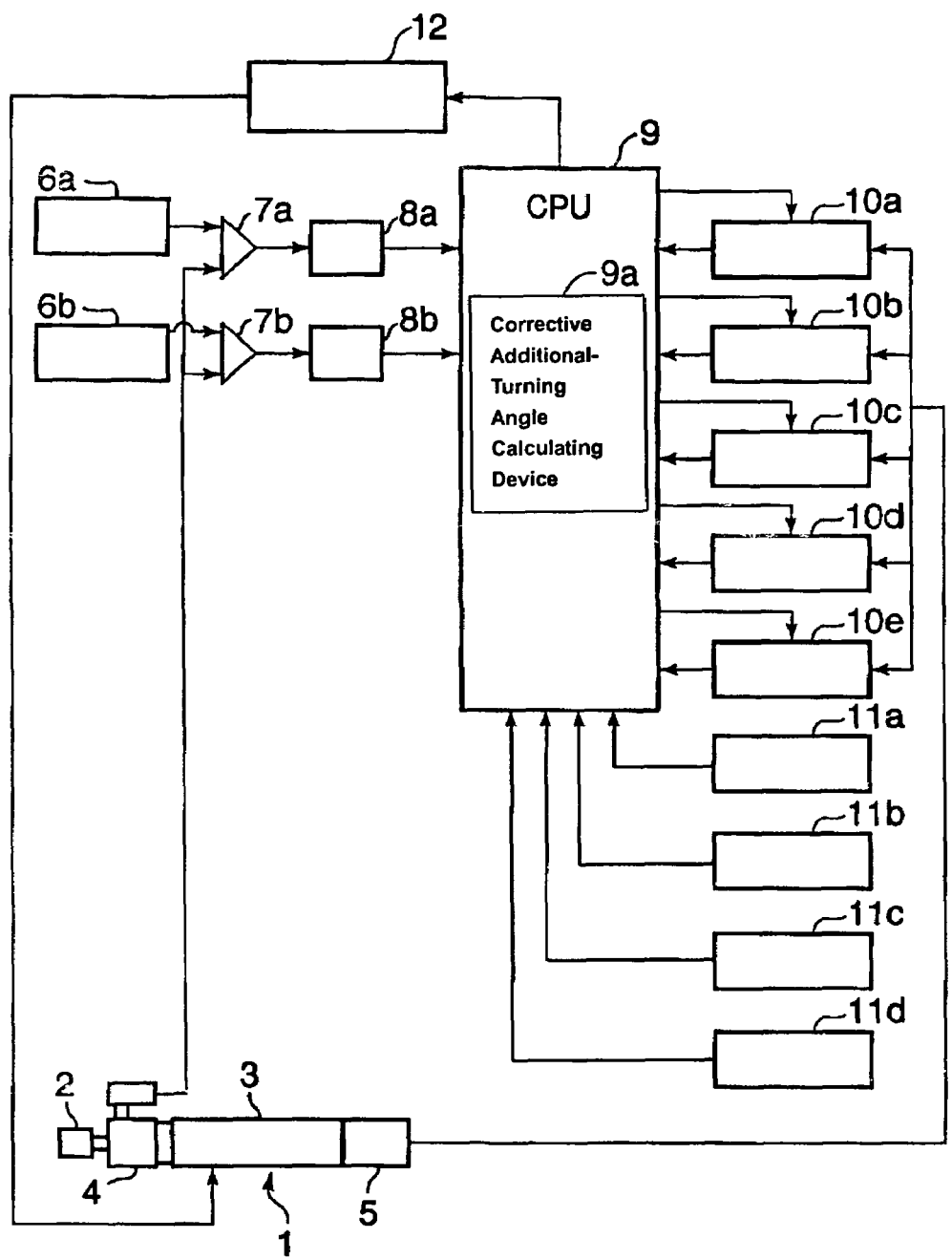
FIG. 1 is a block diagram of a bolt tightening apparatus according to an embodiment of the present invention.
Figure 2A:
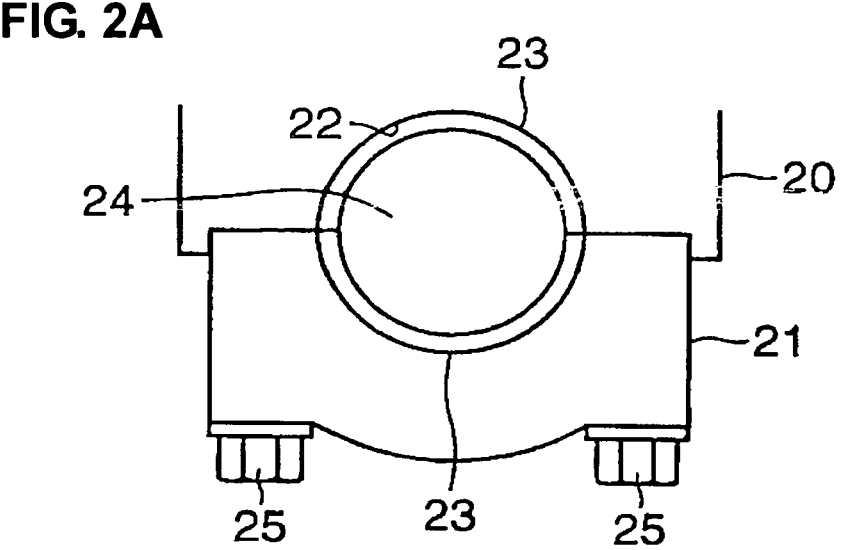
FIG. 2A is a diagram showing a state in which a mounting body and a bearing cap, as fastened members, are fastened with two halves of a half-shell bearing mounted in place.

FIG. 1 shows a bolt tightening apparatus according to a fist embodiment of the present invention. This apparatus, whose constitution will be described in detail below, is suitable, for example, when fastening a mounting body 20 and a bearing cap 21 of a cylinder body of an engine, which is shown in FIG. 2A, by tightening a bolt 25.

The mounting body 20 and bearing cap 21 form a bearing of a crank shaft 24. These members 20, 21 have a half-circle shaped bore respectively so as to form a bearing bore 22 between them. A pair of half shell sections 23 as a half-shell bearing are fitted in the bearing bore 22 around the crank shaft 24. Each half shell section 23 has a half-cylindrical shape, like being formed by splitting a cylindrical member into halves. The mounting body 20 and the bearing cap 21 are fastened with the half shell sections 23 and crank shaft 24 that are located in the bearing bore 22 by tightening the bolt 25.

Figure 2B:
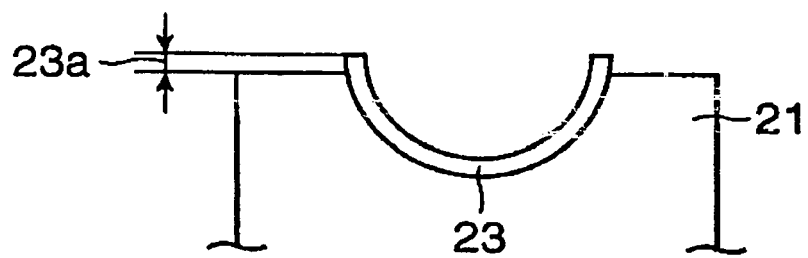
FIG. 2B is a diagram showing a state in which one half of the half-shell bearing sits in the bearing cap before tightening.

Herein, a total periphery (length) of the half shell sections 23 is configured so as to be a little greater (longer) than a periphery of the bearing bore 20 in a state which is before tightening the bolt. Accordingly, when the half shell sections 23 are set in the bearing cap 21, tips of the half shell section 23 project upward slightly from the upper face of the bearing cap 21 (projections 23a), as shown in FIG. 2B. Then, when the bearing cap 21 is fastened to the mounting body 20 by tightening the bolt, the half shell section 23 is deformed in such a manner that the projections 23a are pressed and eliminated (crushed). Thereby, a radiation of heat from a crank system can be promoted, and the half shell sections 23 can be prevented properly from rotating along with the crank shaft 24. Further, the half shell sections 23 can stick closely to the bearing bore 22, thereby providing an appropriate tension to the half shell sections 23.

A small gap (clearance) is provided between the half shell sections 23 and the crank shaft 24. A magnitude of the gap is properly set so as not to be too large and too small, thereby suppressing vibrations and noises or seizure properly.

Hereinafter, the method of fastening the mounting body 20 and the bearing cap 21 will be described in detail. First, the bearing cap 21 is fastened to the mounting body 20 by tightening the bolt with a specified amount of tightening, and then the bearing bore 22 is formed (forming process). Then, after removing the bolt 25, the half shell sections 23 and the crank shaft 24 are set in the bearing bore 22, and the bolt 25 is tightened again (assembling process). Herein, the amount of tightening the bolt in the assembling process is set so as to be substantially equal to that in the forming process of the bearing bore 22, so that the substantially the same bolt axial force can be obtained.

Figure 3:
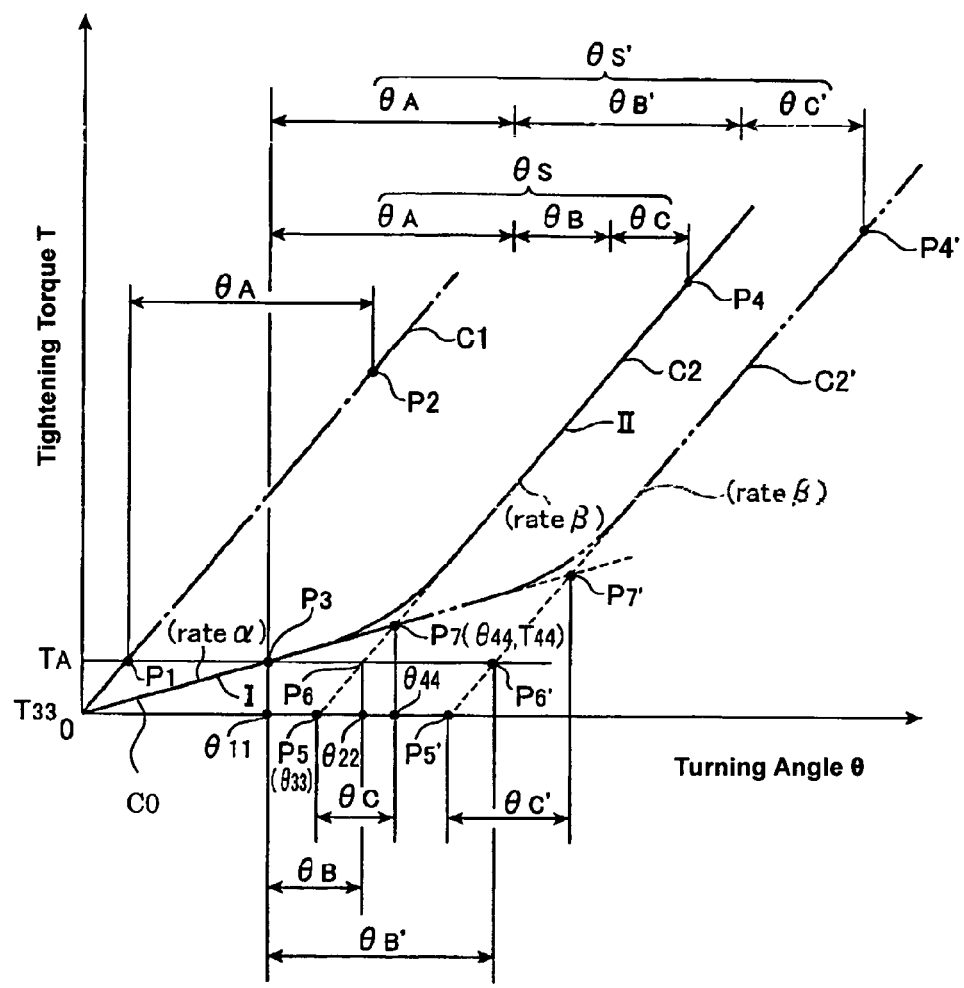
FIG. 3 is a graph showing relationships between a bolt turning angle and a bolt tightening torque according to a first embodiment.
Figure 10:
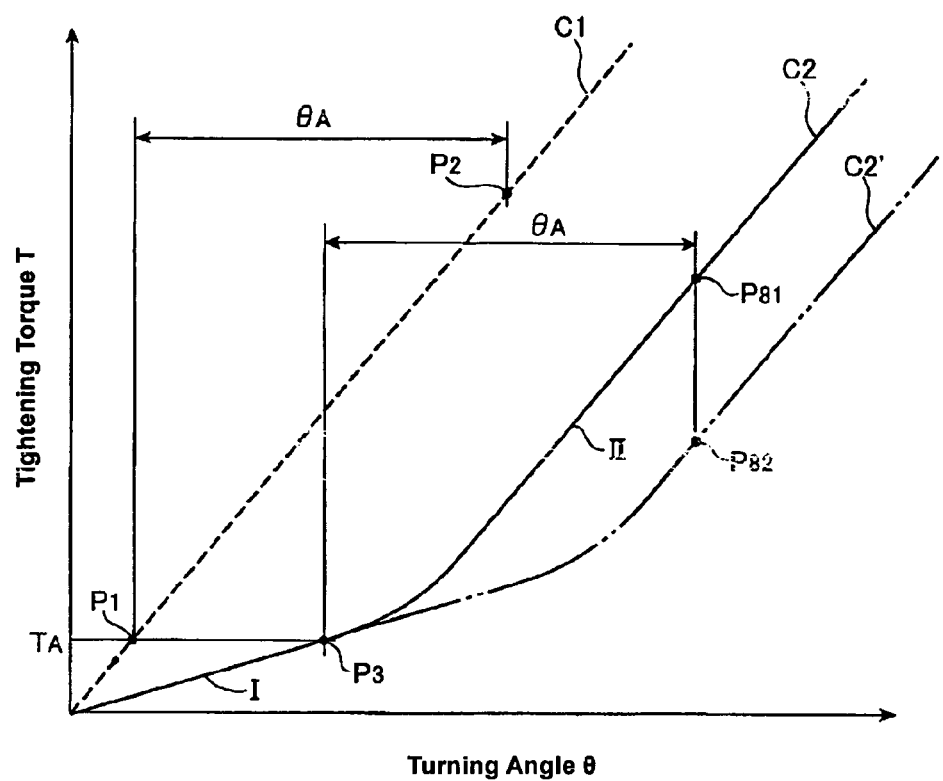
FIG. 10 is a graph showing relationships between a bolt turning angle and a bolt tightening torque according to the conventional torque+angle method.
Figure 11:
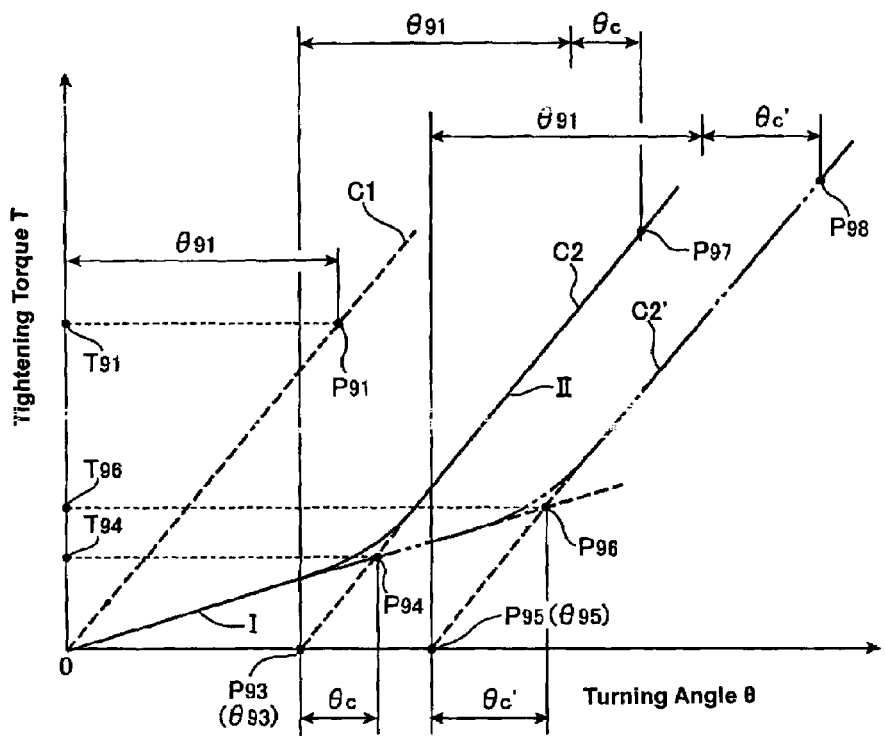
FIG. 11 is a graph showing relationships between a bolt turning angle and a bolt tightening torque according to another conventional seating-point angle method.

FIG. 3 is a graph showing relationships between a turning angle θ and a tightening torque T of the bolt 25. Tightening torque properties C1 show properties when the bearing bore 22 is formed, and tightening torque properties C2 show properties when fastening with the half shell sections 23. The tightening torque properties C2, which is equivalent to the tightening torque properties C2 in FIG. 10, has bent properties comprising an initial bolt tightening stage I and a late bolt tightening stage II that is subsequent to the stage I. Herein, the half shell sections 23 function as the elastic deforming member that would decreases the effective bolt axial force acting on the fastened members, which was described above in the section of background of the invention. In the initial bolt tightening stage I, the mounting body 20 has not contacted the bearing cap 21 yet, where the bolt tightening force (bolt axial force) is used (consumed) to eliminate (crush) the projections 23a of the half shell sections 23.

Namely, when the mounting body 20 and the bearing cap 21 are assembled, part of the bolt axial force has been consumed to crush the projections 23a of the half shell sections 23, even if the bolt axial force would be obtained equally in both the above-described forming process and assembling process. As a result, the effective bolt axial force that acts on the bearing cap 21 eventually would decrease (the effective bolt axial force acting on the bearing cap 21 in the assembling process is smaller than that in the forming process). Namely, the clearance after the assembling tends to become large.

A bolt tightening apparatus of the present embodiment adopts the torque+angle method, in which at first the bolt 25 is tightening until the bolt tightening torque reaches (becomes) the predetermined snug torque $T_A$ and subsequently the bolt is turned by a total turning angle θS that is equivalent to the sum of a predetermined initial-set turning angle $θ_A$ and a corrective additional-turning angle ($θ_B+θ_C$) that is calculated during the bolt tightening. For example, in the tightening torque properties C1, the bolt is tightened until the bolt tightening torque reaches the snug torque $T_A$ (point P1), and then turned by the initial-set turning angle $θ_A$. Thus, the bolt tightening is finished at a point P2.

Meanwhile, in the tightening torque properties C2, the bolt is tightened until the bolt tightening torque reaches the snug torque $T_A$, and then turned by the total turning angle θS that is equivalent to the sum of a predetermined initial-set turning angle $θ_A$ and the corrective additional-turning angle (first corrective additional-turning angle $θ_B$+ second corrective additional-turning angle $θ_C$). Thus, the bolt tightening is finished at a point P4.

Herein, the first corrective additional-turning angle $θ_B$ is to compensate for a situation in which a bolt turning angle θ22 (point P6) that corresponds to the snug torque $T_A$ on an extension line of the late bolt tightening stage II of the bolt tightening torque properties C2 is greater than a bolt turning angle θ11 (point P3) that corresponds to the snug torque $T_A$ on a line of the initial bolt tightening stage I of the bolt tightening torque properties C2. Specifically, the first corrective additional-turning angle $θ_B$ is calculated (obtained) as being equivalent to an angle difference (θ22−θ11) between the angle θ11 (hereinafter, referred to as a first corrective starting point angle θ11) corresponding to the snug torque $T_A$ and the angle θ22 (hereinafter, referred to as a first corrective ending point angle θ22) corresponding to the snug torque $T_A$ on the extension line of the late bolt tightening stage II of the bolt tightening torque properties C2.

Meanwhile, the second corrective additional-turning angle $θ_C$ is to compensate for a decrease of the effective bolt axial force acting on the bearing cap 21 that is caused by the existence of the initial bolt tightening stage I of the bolt torque properties (the crush of the projections 23a of the half shell section 23 in the present embodiment). The compensation is applied in such a manner that the greater an amount of decrease of the effective bolt axial force is, the greater an amount of that compensation is. Specifically, the second corrective additional-turning angle $θ_C$ is calculated (obtained) as being equivalent to an angle difference (θ44−θ33) between a second corrective starting point angle θ33 (point P5, this is a theoretical seating point) corresponding to a second corrective starting point torque T33 (T33=0 in the present embodiment) on the extension line of the late bolt tightening stage II of the bolt tightening torque properties C0 and a second corrective ending point angle θ44 corresponding to a point of intersection (point P7) of an extension line of the initial tightening stage I of the bolt tightening torque properties C2 and the extension line of the late bolt tightening stage II of the bolt tightening torque properties C2.

The above-described points P5, P6 and P7, hypothetical points, are calculated, by considering the initial bolt tightening stage I of the bolt tightening torque properties C0 and the late bolt tightening stage II of the bolt tightening torque properties C2 as a linear function, respectively. Accordingly, a first torque gradient a for the initial tightening stage I and a second torque gradient β for the initial tightening stage II need to be obtained.

Figure 4:
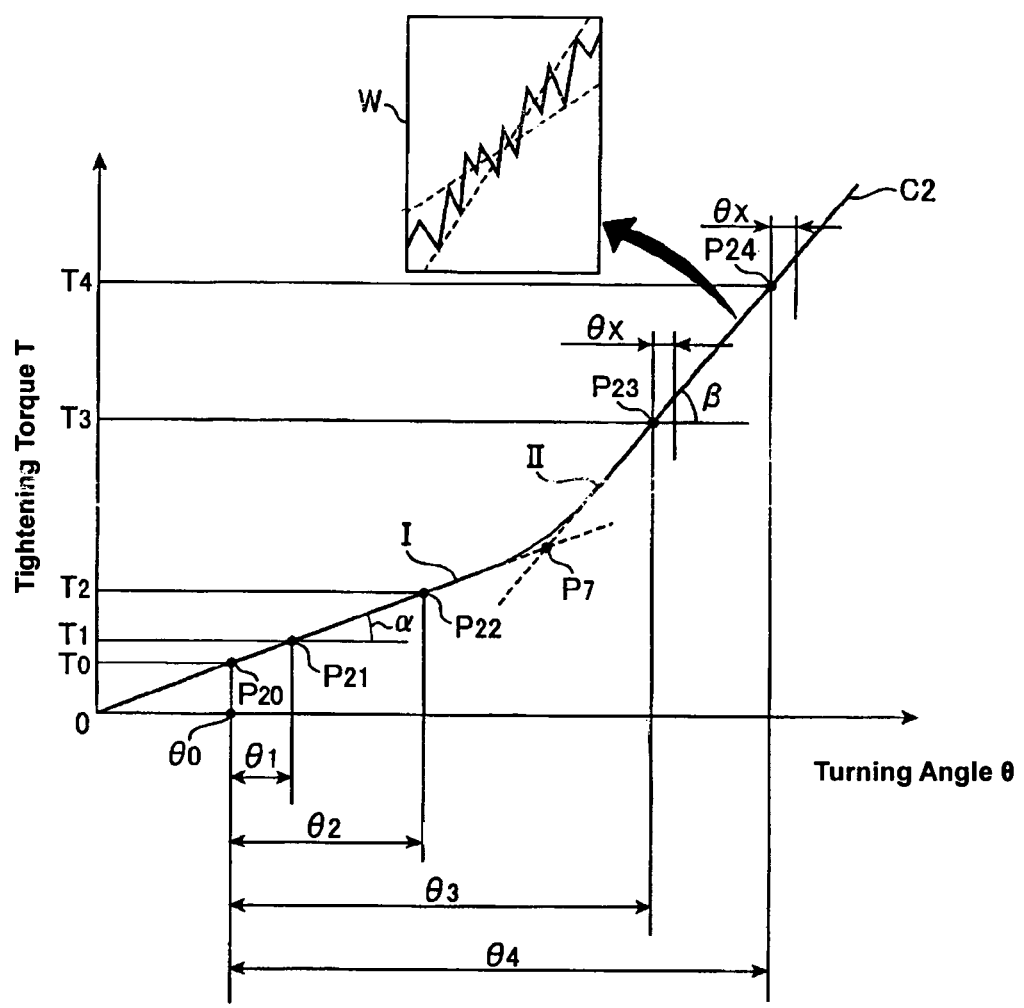
FIG. 4 is an explanatory diagram showing how a first torque gradient and a second torque gradient are obtained in bolt tightening torque properties.

FIG. 4 is an explanatory diagram showing how the first torque gradient α and the second torque gradient β are obtained in the bolt tightening torque properties C2. In obtaining the first and second torque gradients α, β, a standard torque T0, a gradient calculation starting point angle η1 and a gradient calculation ending point angle η2 for the first torque gradient α, and a gradient calculation starting point angle θ3 and a gradient calculation ending point angle θ4 for the second torque gradient β are set in advance. In the bolt tightening torque properties C2 shown in FIG. 4, torques T0, T1, T2, T3 and T4 corresponds to the turning angles θ0, θ1, θ2, θ3, θ4, respectively. These points on the bolt tightening torque properties C2 are denoted by P20, P21, P22, P23 and P24, respectively. The standard torque T0, gradient calculation starting point angle θ1 and gradient calculation ending point angle θ2 are set properly in their magnitudes such that the points P20, P21 and P22 are on the line of the initial bolt tightening stage I. Meanwhile, the gradient calculation starting point angle θ3 and gradient calculation ending point angle θ4 are set properly in their magnitudes such that the points P23 and P24 are on the line of the late bolt tightening stage II.

The tightening torque T3, T4 at the points P23, P24 are obtained respectively as an average magnitude of tightening torques that are detected when the bolt is turned by a small amount of turning angle $θ_X$ from the respective points P23, P24. Actual bolt tightening torque properties C2 include some noises (micro variations) caused by a stuck phenomena etc. in bolt turning, as shown a partial enlarged window W. The above-described method of obtaining the tightening torque T3, T4 could eliminate these noises properly.

Retuning to FIG. 1, the constitution of the bolt tightening apparatus according to the present embodiment will be described. The apparatus comprises a socket 2 that is engaged with a head of the bolt, a torque transducer 4 (torque detecting device) to detect a torque applied to the bolt by the socket 2, a drive motor 3 to rotate the socket 2, and a nut runner 1 (bolt turning device) comprising an angle encoder 5 (bolt turning angle detecting device) that detects the bolt turning angle by detecting a rotational angle of the drive motor 3.

Further, the bolt tightening apparatus comprises a torque setter 6a for setting the standard torque T0 shown in FIG. 4, a torque setter 6b for setting the snug torque $T_A$ shown in FIG. 3, comparators 8a, 8b for respectively comparing magnitudes of bolt tightening torques set by the torque setters 6a, 6b and those detected by the torque transducer 4 and outputting mach signals for the bolt tightening torques, and analogue gates 8a, 8b for outputting control signals corresponding to the match signals fed from the comparators 8a, 8b to CPU 9 (control device). Further, it comprises a servo amplifier 12 for controlling the drive motor 3 according to a control signal fed from the CPU 9.

The apparatus includes setters 11a, 11c for setting the gradient calculation starting point angles θ1, θ3 and the setters 11b, 11d for setting the gradient calculation ending point angles θ2, θ4, which are shown in FIG. 4. Further, it includes angle gates 10a, 10c and angle gates 10b, 10d, which are respective gates for feeding to the CPU 9 control signals that respectively indicate that the bolt tightening angle θ has reached the gradient calculation starting point angles θ1, θ3 or that the bolt tightening angle θ has reached the gradient calculation starting point angles θ2, θ4 after reaching the standard torque T0. Further, it includes an angle gate 10e for feeding a control signal indicating that the bolt tightening angle θ has reached the total angle θS shown in FIG. 3 after reaching the snug torque $T_A$.

Herein, the initial-set turning angle $\theta_A$ is a fixed value that has been stored in the CPU 9 in advance, while the first corrective additional-turning angle $\theta_B$ and the second corrective additional-turning angle $\theta_C$ (i.e., the corrective additional-turning angle ($\theta_B+\theta_C$)) are values that change according to fluctuations of the bolt tightening torque properties C2. The corrective additional-turning angle ($\theta_B+\theta_C$) is calculated by a corrective additional-turning angle calculation device 9a in the CPU 9 via the calculation method that is described above referring to FIGS. 3 and 4.

Figure 5:
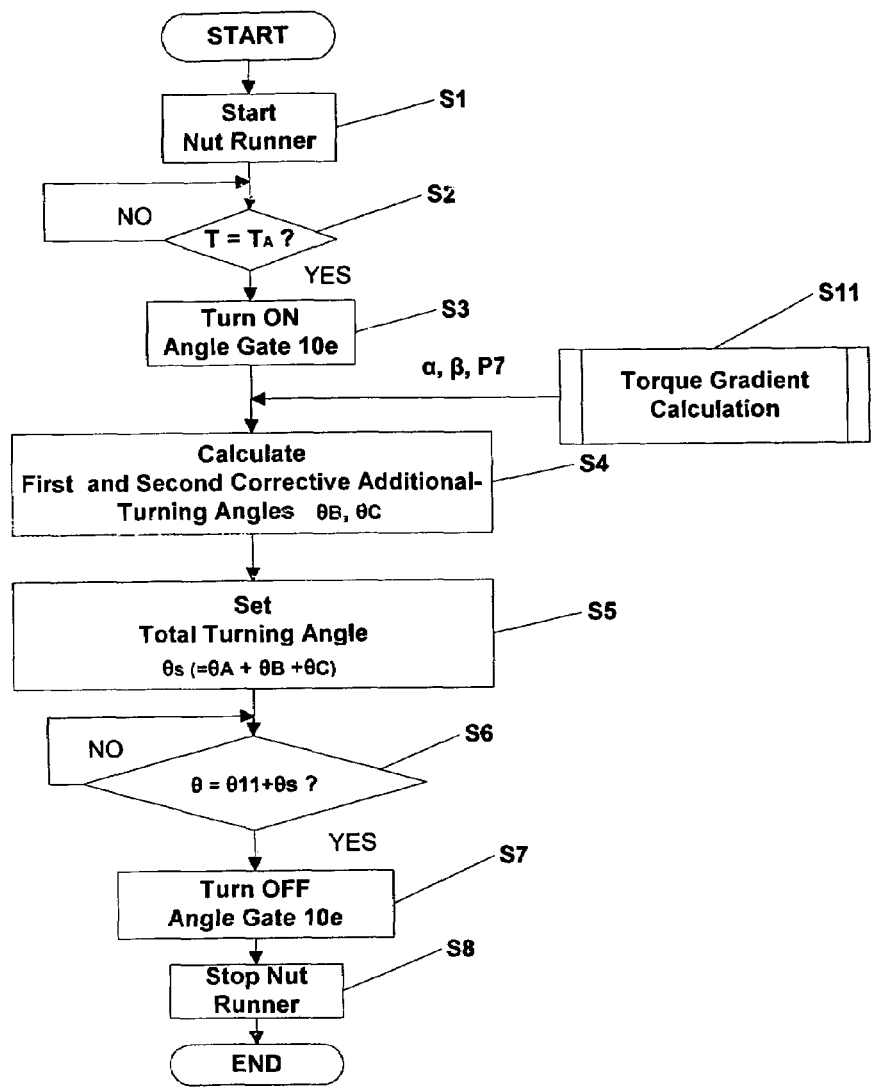
FIG. 5 is a main flowchart of a control according to the first embodiment.
Figure 6:
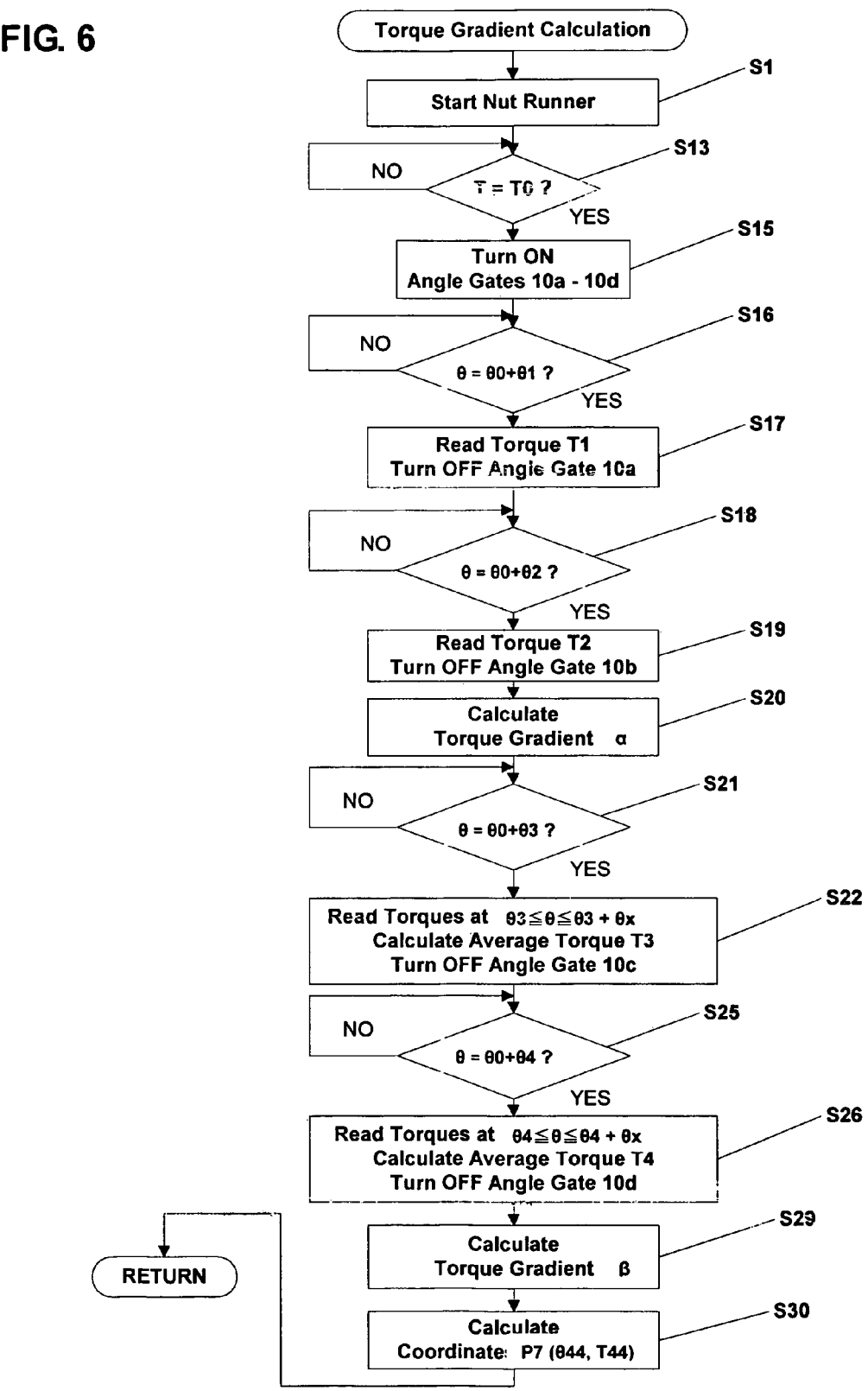
FIG. 6 is a flowchart of a subroutine of the flowchart of FIG. 5.

Next, the operation of the bolt tightening apparatus will be described referring to control flowcharts of FIGS. 5 and 6. FIG. 5 shows a main flowchart of control. After start, the nut runner 1 is started according to a start signal fed from the outside (step S1). When the output signal T fed from the torque transducer 4 and the signal $T_A$ fed from the torque setter 6b match, i.e., the tightening torque T=the snug torque $T_A$ (YES in step S2), the angle gate 10e is turned ON and the first corrective starting point angle θ11 (see FIG. 3) is memorized as a present bolt turning angle at this point (step S3). Herein, this first corrective starting point angle θ11 is also an angle for starting the bolt turning control.

Then, the nut runner 1 keeps being operated. During this operation, inputs of the second torque gradient β, the coordinates P7 (θ44, T44) (see FIG. 3), etc., are fed in order through a torque gradient calculation routine (step S11; see FIG. 6).

The first corrective additional-turning angle $\theta_B$ and the second corrective additional-turning angle $\theta_C$ are calculated in step S4 based on data obtained via the step S11. Specifically, at first it is set that $\theta_B$=θ22−θ11. Herein, θ22=θ44−(T44−$T_A$)/β, and $\theta_C$=T44/β.

Next, it is set that a total turning angle $\theta_S$ (=$\theta_A$+$\theta_B$+$\theta_C$) (step S5). And, the angle gate 10e is turned OFF (step S7) at a point when the bolt tightening angle θ matches the sum of the first corrective starting point angle θ11 and the total angle $\theta_S$ based on the output signals fed from the angle encoder 5 (YES in step S6). Then, the operation of the nut runner 1 is stop, thereby finishing the bolt tightening (step S8).

Next, the torque gradient calculation routine in the step S11 of FIG. 5 will be described referring to FIG. 6. As described above, this routine flows in parallel with the main routine after the start of operation of the nut runner 1 (step S1 that is common to the main routine).

After the step S1, when the output signal T from the torque transducer 4 matches the output signal T0 from the torque setter 6a, i.e., the tightening torque T=the standard torque T0 (YES in step S13), the respective angle gates 10a-10d are turned ON, memorizing the standard bolt turning angle θ0 as the bolt turning angle at this point (step S15).

The, at a point when the sum of the standard bolt turning angle θ0 and the gradient calculation starting point angle θ1 that is preset at the angle setter 11a matches the output signal θ fed from the angle encoder 5 (YES in step S16), the signal T1 of the torque transducer 4 is memorized. Namely, the bolt tightening torque T1 is read. Then, the angle gate 10a is turned OFF (step S17).

The nut runner 1 is further driven. At a point when the sum of the standard bolt turning angle θ0 and the gradient calculation ending point angle θ2 that is preset at the angle setter 11b matches the output signal θ fed from the angle encoder 5 (YES in step S18), the signal T2 of the torque transducer 4 is memorized. Namely, the bolt tightening torque T2 is read. Then, the angle gate 10b is turned OFF (step S19).

Next, the first torque gradient a is calculated. It is set that α=(T2−T1)/(θ2−θ1) (step S20).

The nut runner 1 is further driven, and from a point when the sum of the standard bolt turning angle θ0 and the gradient calculation starting point angle θ3 that is preset at the angle setter 11c matches the output signal 0 fed from the angle encoder 5 (YES in step S21), the nut runner 1 is turned by the above-described small amount of turning angle $\theta_X$. During this period, the output signals fed from the torque transducer 4 are memorized in order, and those are averaged. Namely, an average torque T3 is calculated. Then, the angle gate 10c is turned OFF (step S22).

After that, the nut runner 1 is further driven, and from a point when the sum of the standard bolt turning angle θ0 and the gradient calculation ending point angle θ4 that is preset at the angle setter 11d matches the output signal θ fed from the angle encoder 5 (YES in step S25), the nut runner 1 is turned by the small amount of turning angle $\theta_X$. During this period, the output signals fed from the torque transducer 4 are memorized in order as well, and those are averaged and an average torque T4 is calculated. The angle gate 10d is turned OFF (step S26).

Next, the second torque gradient β is calculated. It is set that β=(T4−T3)/(θ4−θ3) (step S29).

Subsequently, the coordinates P7 (θ44, T44) shown in FIG. 3 are calculated, and the control sequence returns. The coordinates P7 (θ44, T44) are obtained at the intersection point of a linear function: T=α×(θ−θ1−θ0)+T1, and a linear function: T=β×(θ−θ3−θ0)+T3 (step S30).

Figure 7A:
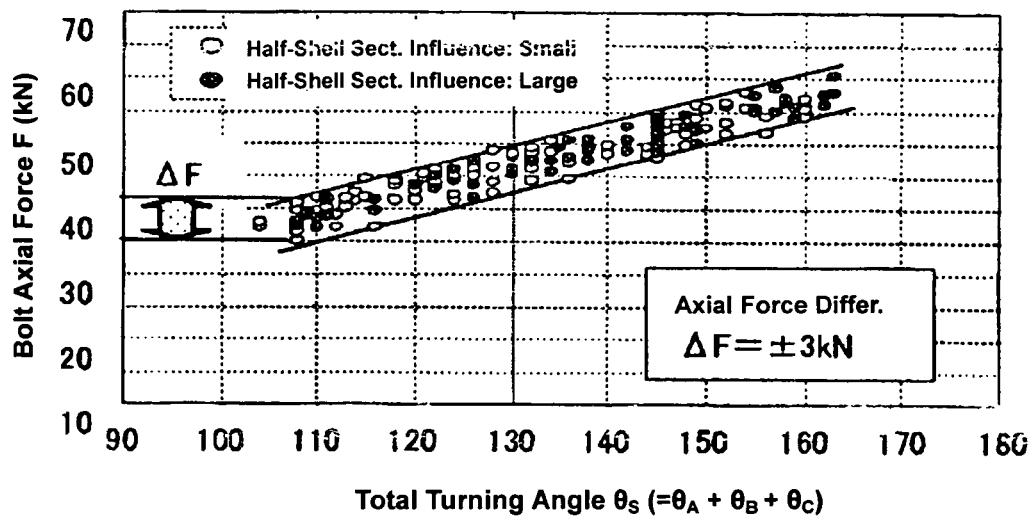
FIG. 7A is a graph showing scattering of a bolt axial force according to a bolt tightening apparatus of the present embodiment.
Figure 7B:
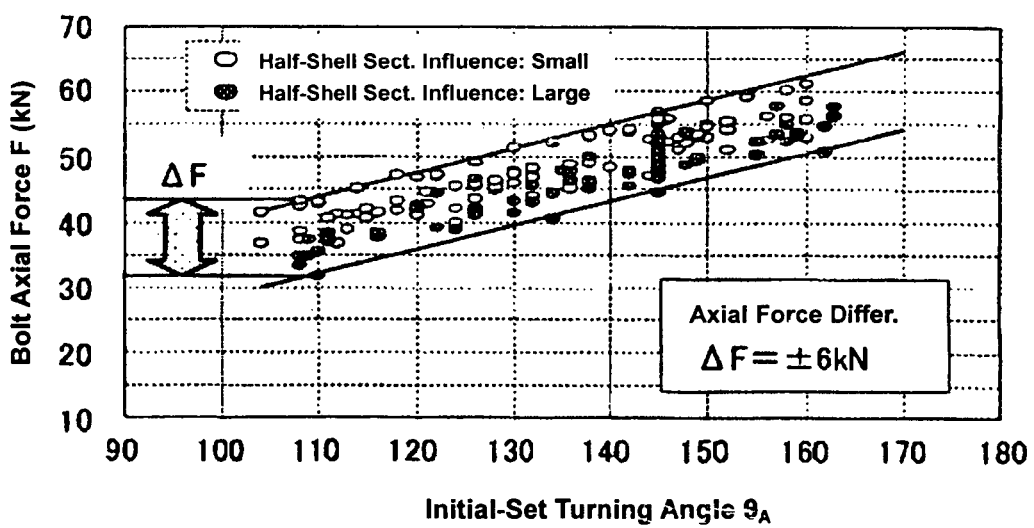
FIG. 7B is a graph showing scattering of the bolt axial force according to a conventional bolt tightening apparatus (a conventional torque+angle method).

FIG. 7A is a graph showing scattering of a bolt axial force according to the bolt tightening apparatus of the present embodiment, and FIG. 7B is a graph showing scattering of the bolt axial force according to the conventional bolt tightening apparatus (the conventional torque+angle method). The axis of abscissas of FIG. 7A shows the total angle $\theta_S$ after tightening the bolt with the snug torque $T_A$. The axis of abscissas of FIG. 7B shows the initial-set turning angle $\theta_A$ after tightening the bolt with the snug torque $T_A$. The axis of ordinates of the both graphs shows the bolt tightening axial force. Plots with white circles show a case in which the influence of the half shell sections 23 is small, while plots with black circles show a case in which the influence of the half shell sections 23 is large. As apparent from FIG. 7A, 7B, the axial force according to the conventional bolt tightening apparatus scatters within a range of ±6 kN, while the axial force according to the present embodiment's bolt tightening apparatus scatters within a range of ±3 kN. Namely, the present embodiment's apparatus decreases the scattering of the bolt axial force by half and thus shows an improved stability of the bolt axial force, compared with the conventional one.

Figure 8:
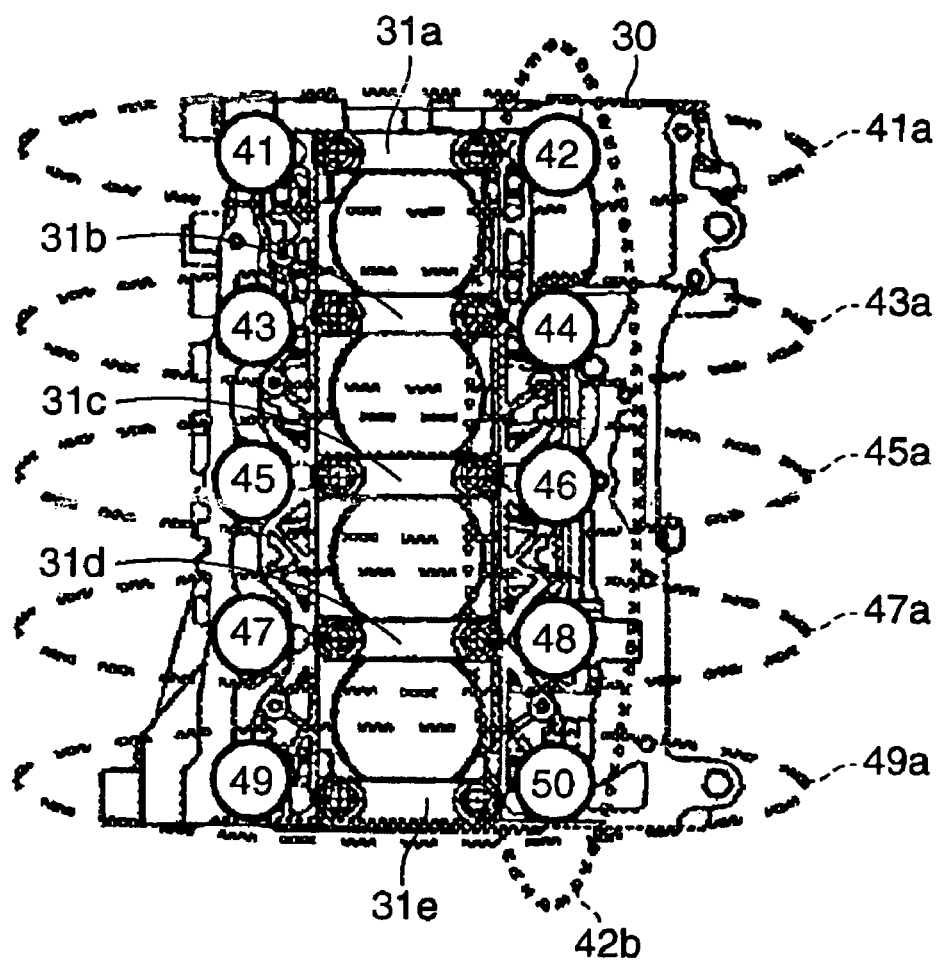
FIG. 8 is a diagram showing bolt layout at a bearing portion of a cylinder body of a 4-cylinder engine as an example of the first embodiment.

FIG. 8 is a diagram showing bolt layout at bearing portions 31a-31e of a cylinder body 30 of a 4-cylinder engine. At each of the five bearing portions 31a-31e, the fastening of the mounting body 20 and the bearing cap 21, which is shown in FIG. 2A, is provided. Two bolts are used at each bearing portion, in total 10 bolts are tightened thereby. In tightening these bolts 41-50 by the present embodiment's apparatus, each bolt may be tightened using the corrective additional-turning angle ($\theta_B+\theta_C$) that is calculated individually for each one. Or, these bolts may be divided into groups and the bolts in one group may be tightened using the angle that is obtained by averaging for each group. For example, the bolts are divided into a group 41a comprised of the bolts 41, 42 of the bearing portion 31a, a group 43a comprised of the bolts 43, 44 of the bearing portion 31b, a group 45a comprised of the bolts 45, 46 of the bearing portion 31c, a group 47a comprised of the bolts 47, 48 of the bearing portion 31d, and a group 49a comprised of the bolts 49, 50 of the bearing portion 31e. And, the corrective additional-turning angles ($\theta_B+\Theta_C$) for respective groups 41a-49a are calculated with averaging in respective groups. Namely, for example, for the group 41a, the respective corrective additional-turning angles ($\theta_B+\theta_C$) are calculated individually for the bolts 41 and 42, respectively. Then, an average of those angles is obtained. And, this obtained average angle is applied to both the bolts 41 and 42 as the corrective additional-turning angle ($\theta_B+\theta_C$).

Or, the average of all corrective additional-turning angles ($\theta_B+\theta_C$) that are calculated individually for the bolts 41-50 is obtained, and this average may be applied to all of the bolts 41-50 as the corrective additional-turning angle ($\theta_B+\theta_C$).

Or, the bolts 42, 44, 46, 48 and 50 located on one side of the engine are grouped in one group 42b, and the respective corrective additional-turning angles ($\theta_B+\theta_C$) of these bolts are averaged. This averaged angle may be applied to the bolts 42, 44, 46, 48 and 50 in the group 42b. In this case where the bolts at one side of the engine are grouped, the corrective additional-turning angle ($\theta_B+\theta_C$) for the group whose bolts are located at an engine side where a relatively larger engine vibrations occur may be calculated so as to have a relatively greater corrective additional-turning angles ($\theta_B+\theta_C$). Thereby, the clearance at the engine side where the relatively larger engine vibrations occur can be properly suppressed.

Next, a second embodiment of the present invention will be described. The bolt tightening apparatus according to the second embodiment is different from that according to the above-described first embodiment in using a second corrective additional-turning angle $\theta_D$ in place of the second corrective additional-turning angle $\theta_C$.

Figure 9:
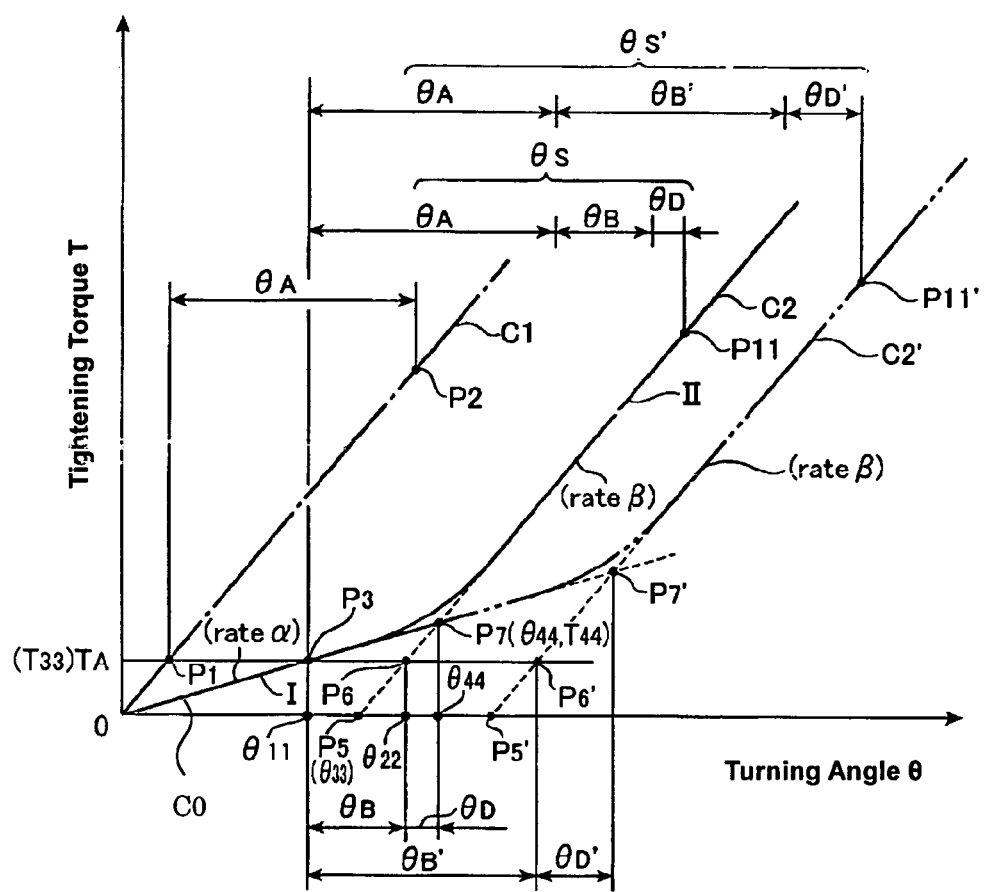
FIG. 9 is a graph showing relationships between a bolt turning angle and a bolt tightening torque according to a second embodiment.

FIG. 9 is a graph showing relationships between the bolt turning angle $\theta$ and the bolt tightening torque T of the bolt 25 according to the second embodiment. Herein, the same portions as those shown in FIG. 3, the first embodiment, are denoted by the same reference characters, whose descriptions will be omitted. As shown in FIG. 9, the second corrective additional-turning angle $\theta_D$ is calculated (obtained) as being equivalent to an angle difference ($\theta 44-\theta 22$) between a second corrective starting point angle $\theta 22$ (point P6) corresponding to the second corrective starting point torque T33 (T33=$T_4$ in the present embodiment) on the extension line of the late bolt tightening stage II of the bolt tightening torque properties C2 and the second corrective ending point angle $\theta 44$ corresponding to the intersection point (point P7) of the extension line of the initial tightening stage I of the bolt tightening torque properties C0 and the extension line of the late bolt tightening stage II of the bolt tightening torque properties C2.

Although the second corrective additional-turning angle $\theta_D$ of the second embodiment may be smaller than the second corrective additional-turning angle $\theta_C$ of the first embodiment, the scattering of the bolt axial force due to changing of the bet point P7 can be properly suppressed in the second embodiment as well. Further, the decrease of the effective bolt axial force acting on the tightened members due to the existence of the initial bolt tightening stage I can be properly corrected.

In applying the second embodiment, the second corrective additional-turning angle $\theta_D$ is calculated in the step S4 in the flowchart in FIG. 5 in place of the second corrective additional-turning angle $\theta_C$. Herein, $\theta_D=(T44-T_A)/\beta$, and it is set that $\theta_S=\theta_A+\theta_B+\theta_D$ in the step S5.

The present invention should not be limited to the above-described embodiments, but any modifications or improvements can be adopted within a scope of the claimed invention. For example, it is set that the second corrective starting point torque T33=0 in the first embodiment) or T33=$T_A$ in the second embodiment. Instead, the second corrective starting point torque T33 may be set at any proper magnitude within a rage of 0 through $T_A$.

Also, the fastened members should not be limited to the mounting body 20 and the bearing cap 21 fastened with the half shell sections 23. Any fastened members can be adopted as long as any elastic deforming member is located between those and the amount of deformation of the elastic deforming member is greater than that of the fastened members in the initial bolt tightening stage I.

What is claimed is:

1. A bolt tightening apparatus applicable to a bolt having bolt tightening torque properties, in which a torque gradient expressed in terms of the ratio of an additional tightening torque exerted on a bolt to its additional turning angle has a first torque gradient in an initial bolt tightening stage and a second torque gradient in a late bolt tightening stage subsequent to the initial bolt tightening stage, a magnitude of the second torque gradient being greater than that of the first torque gradient, the apparatus comprising:

a bolt turning device operative to turn the bolt around a bolt axis;

a torque detecting device operative to detect a torque applied to the bolt;

a bolt turning angle detecting device operative to detect a bolt turning angle;

a control device operative to control an operation of said bolt turning device; and a corrective additional-turning angle calculating device operative to calculate a conective additional-turning angle that is equivalent to an amount of additional tightening of the bolt to be added to a predetermined amount of initial tightening of the bolt, wherein said control device is configured so to operate said bolt turning device until a bolt tightening torque detected by said torque detecting device becomes a predetermined snug torque and subsequently operate said bolt turning device until a bolt turning angle detected by said bolt turning angle detecting device becomes a total turning angle that is equivalent to the sum of a predetermined initial-set turning angle and the corrective additional-turning angle calculated by said corrective additional-turning angle calculating device, and said conective additional-turning angle calculating device is configured so as to calculate a first corrective additional-turning angle and a second corrective additional-turning angle, the first corrective additional-turning angle being to compensate for a situation in which a bolt turning angle corresponding to said snug torque on an extension line of said bolt tightening torque properties with the second torque gradient is greater than a bolt turning angle corresponding to said snug torque on a line of said bolt tightening torque properties with the first torque gradient, and said second corrective additional-turning angle being to compensate for a decrease of an effective bolt axial force that is caused by an existence of said bolt tightening torque properties with the first torque gradient, the sum of the first corrective additional-turning angle and the second corrective additional-turning angle being said corrective additional-turning angle.

2. The bolt tightening apparatus of claim 1, wherein said first corrective additional-turning angle calculated by said corrective additional-turning angle calculating device is equivalent to an angle difference between a first corrective starting point angle that is equivalent to said bolt turning angle corresponding to the snug torque on the line of the bolt tightening torque properties with the first torque gradient and a first corrective ending point angle that is equivalent to said bolt turning angle corresponding to the snug torque on the extension line of the bolt tightening torque properties with the second torque gradient.

3. The bolt tightening apparatus of claim 1, wherein said second corrective additional-turning angle calculated by said corrective additional-turning angle calculating device is equivalent to an angle difference between a second corrective starting point angle corresponding to a second corrective starting point torque that is equal to or smaller than said snug torque on the extension line of the bolt tightening torque properties with the second torque gradient and a second corrective ending point angle corresponding to a point of intersection of an extension line of said bolt tightening torque properties with the first torque gradient and the extension line of the bolt tightening torque properties with second torque gradient.

4. The bolt tightening apparatus of claim 1, wherein said torque gradient calculated by said conective additional-turning angle calculating device is calculated based on a gradient-calculation staffing point angle that is obtained by turning the bolt from a standard turning angle corresponding to a predetermined standard torque by a specified angle, a gradient-calculation ending point angle that is obtained by further turning the bolt from the gradient-calculation starting point angle by a specified angle, and respective bolt tightening torques corresponding to the gradient-calculation starting point angle and the gradient-calculation ending point angle.

5. The bolt tightening apparatus of claim 1, wherein a mounting body and a bearing cap, which have a half-circle shaped bearing bore respectively, are fastened with two halves of a half-shell bearing fitted in the bearing bore of the mounting body and the bearing cap, the half shell bearing having an outer periphery that is greater than a periphery of the bearing bore in a state before the mounting body and the bearing cap are fastened, the half shell bearing being deformed in the initial bolt tightening stage in such a manner that a greater part thereof is eliminated when the mounting body and the bearing cap are fastened.

6. The bolt tightening apparatus of claim 1, wherein the bolt tightening apparatus is applied to a case where an elastic deforming member is located between fastened members and the fastened members are fastened to each other with the elastic deforming member by tightening the bolt, and an amount of deformation of the elastic deforming member is greater than that of the fastened member in the initial bolt tightening stage.

7. The bolt tightening apparatus of claim 5, wherein said bearing bore is formed after said bearing cap is fastened to said mounting body by tightening the bolt in such a manner that at first the bolt is tightened with said snug torque and then turned by said initial-set turning angle.

* * * * *